(Model.)
13 Sheets—Sheet 1.
W. P. HALE.
GRAIN BINDER.
No. 267,521.
Patented Nov. 14, 1882.
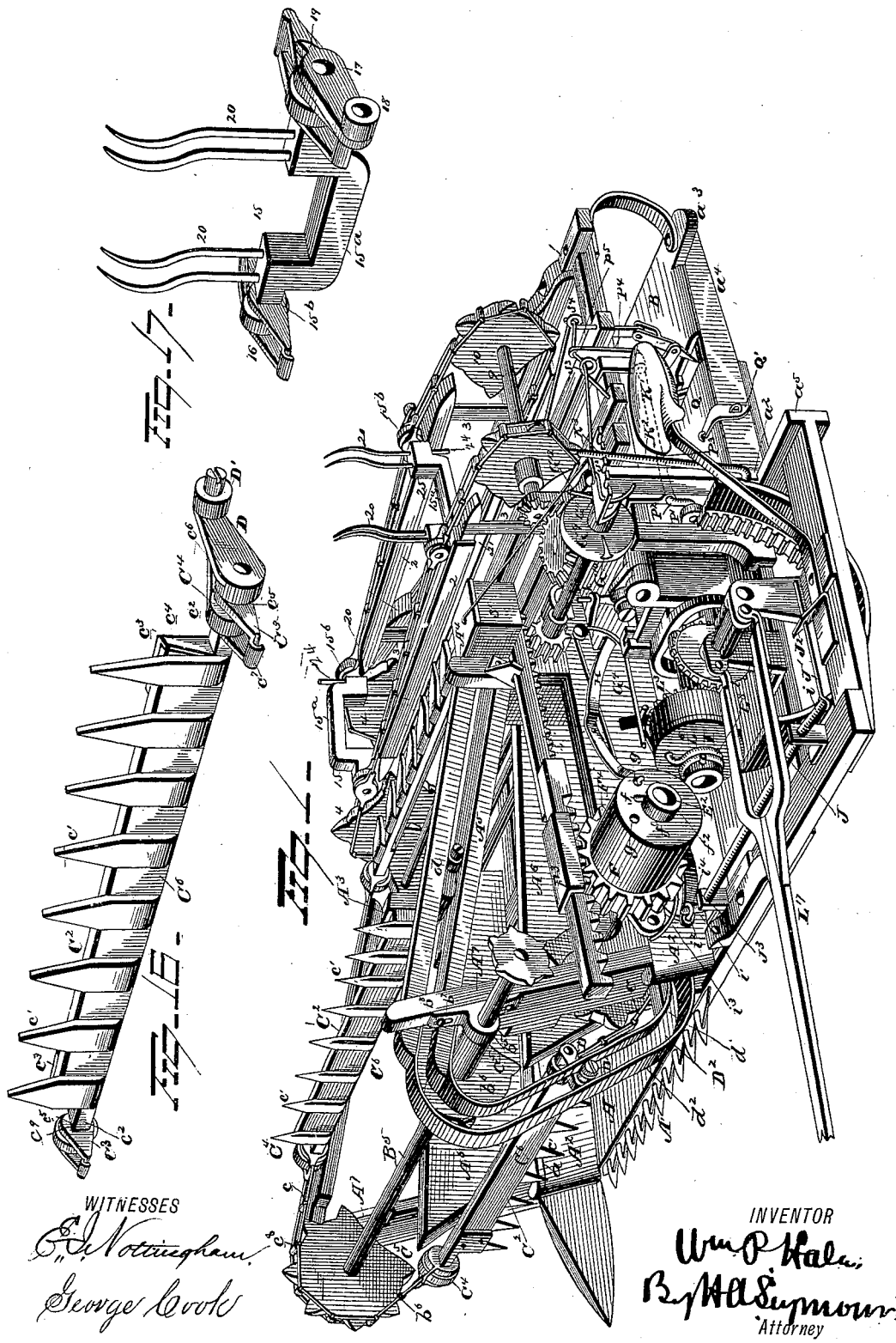
WITNESSES
INVENTOR

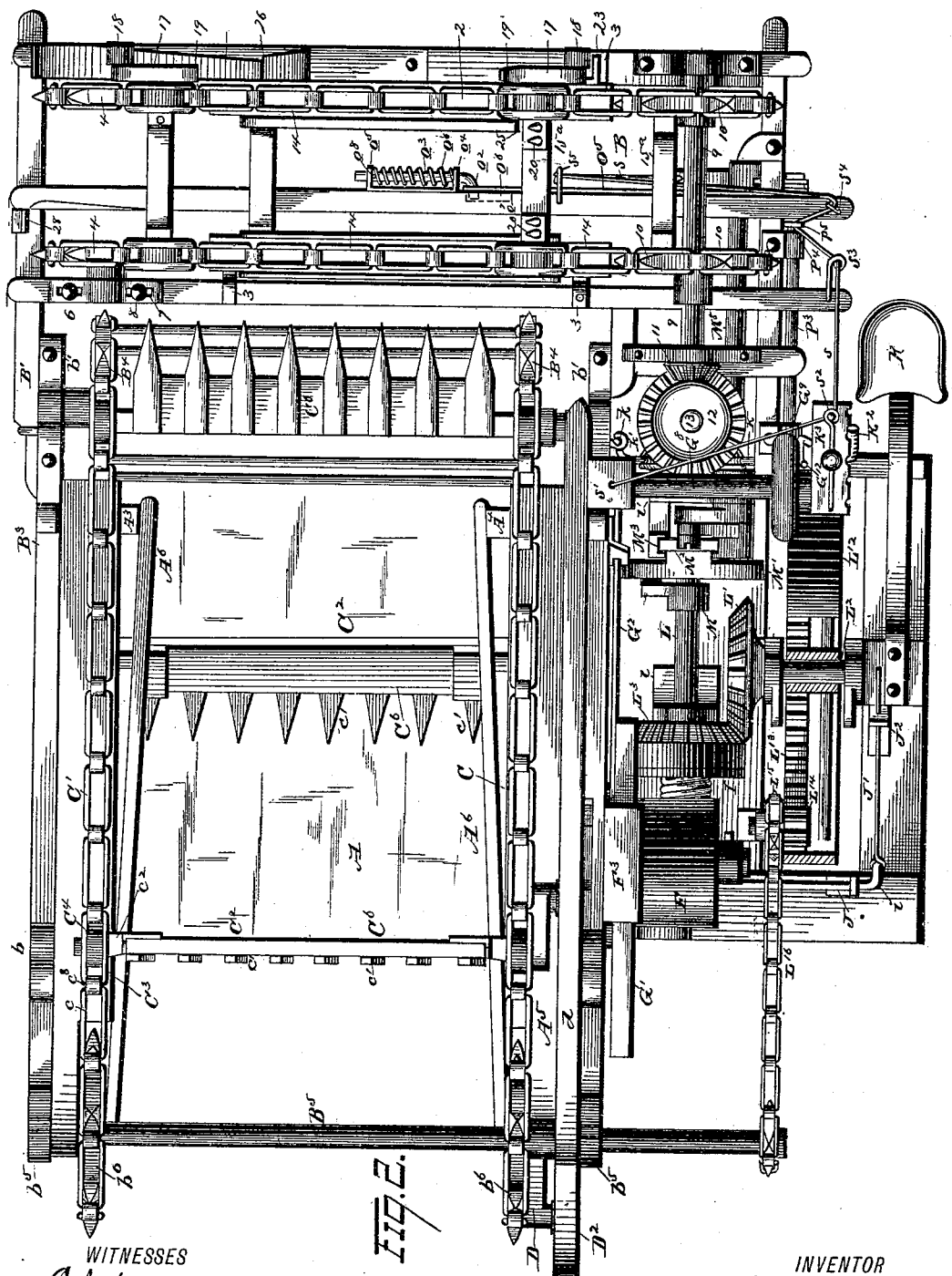

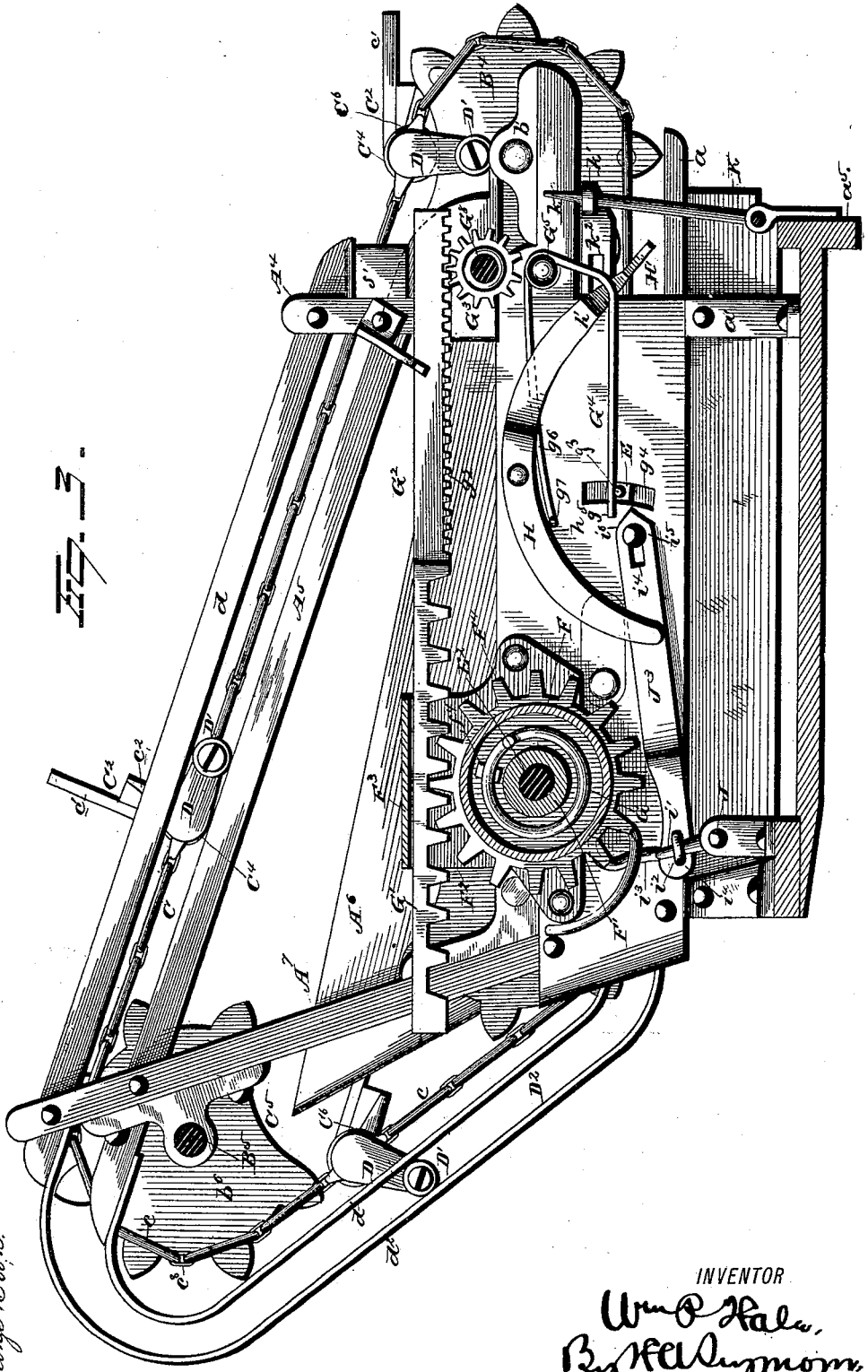

(Model.)
W. P. HALE.
GRAIN BINDER.
No. 267,521.  Patented Nov. 14, 1882.
13 Sheets—Sheet 4.
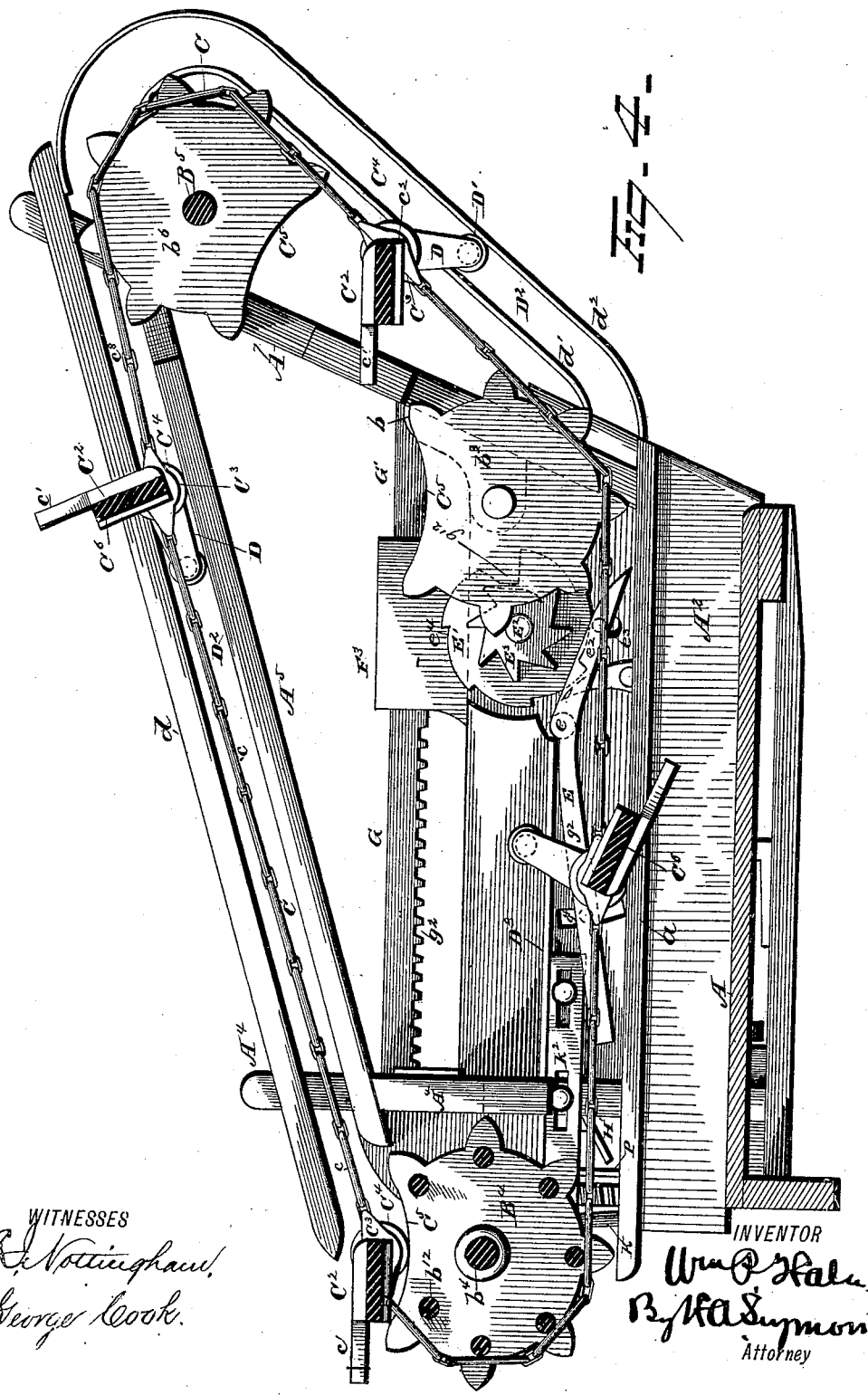

(Model.) 13 Sheets—Sheet 5.
W. P. HALE.
GRAIN BINDER.
No. 267,521. Patented Nov. 14, 1882.
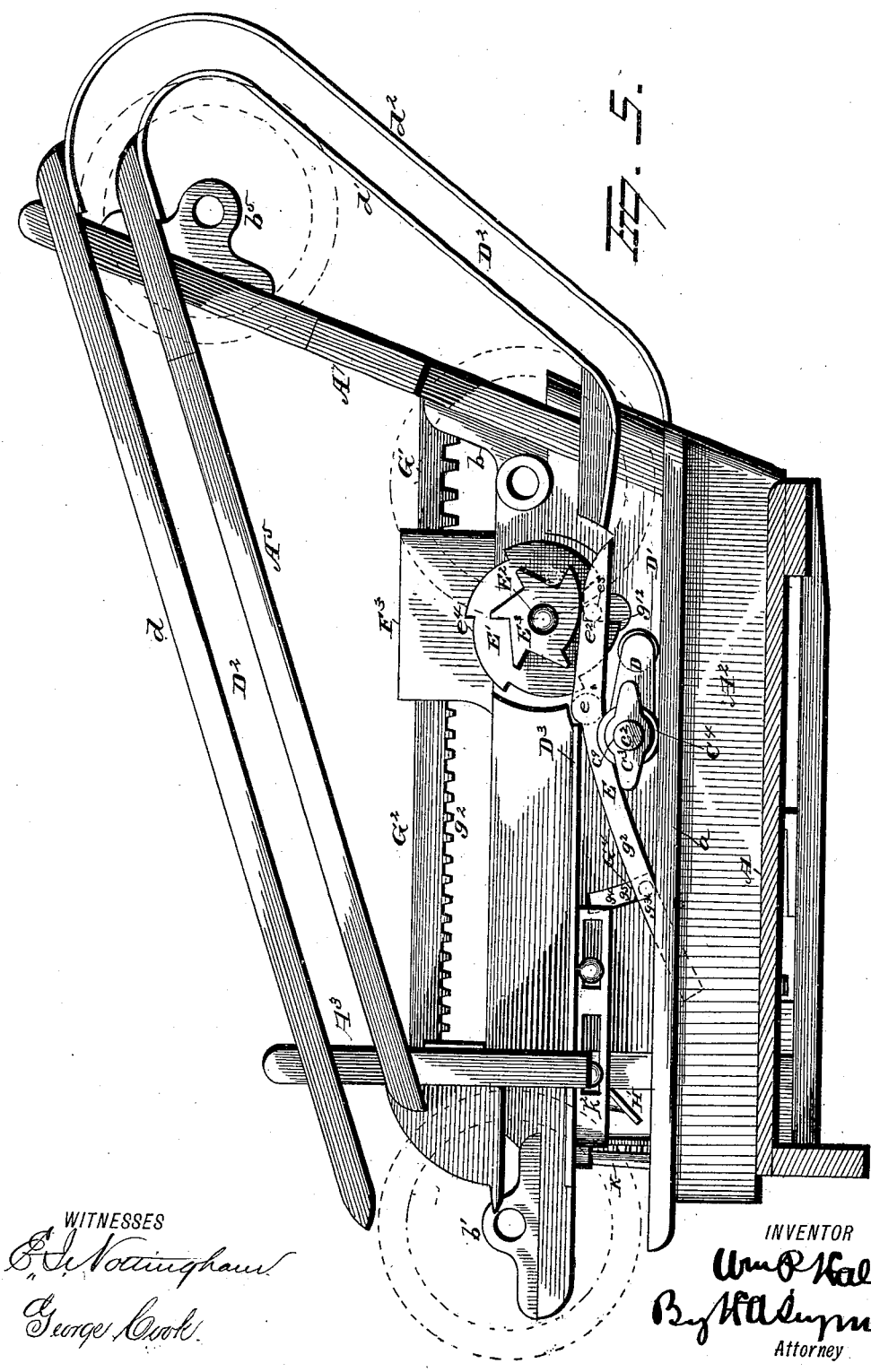
WITNESSES
INVENTOR
Attorney (Model.)
13 Sheets—Sheet 6.
W. P. HALE.
GRAIN BINDER.
No. 267,521. Patented Nov. 14, 1882.
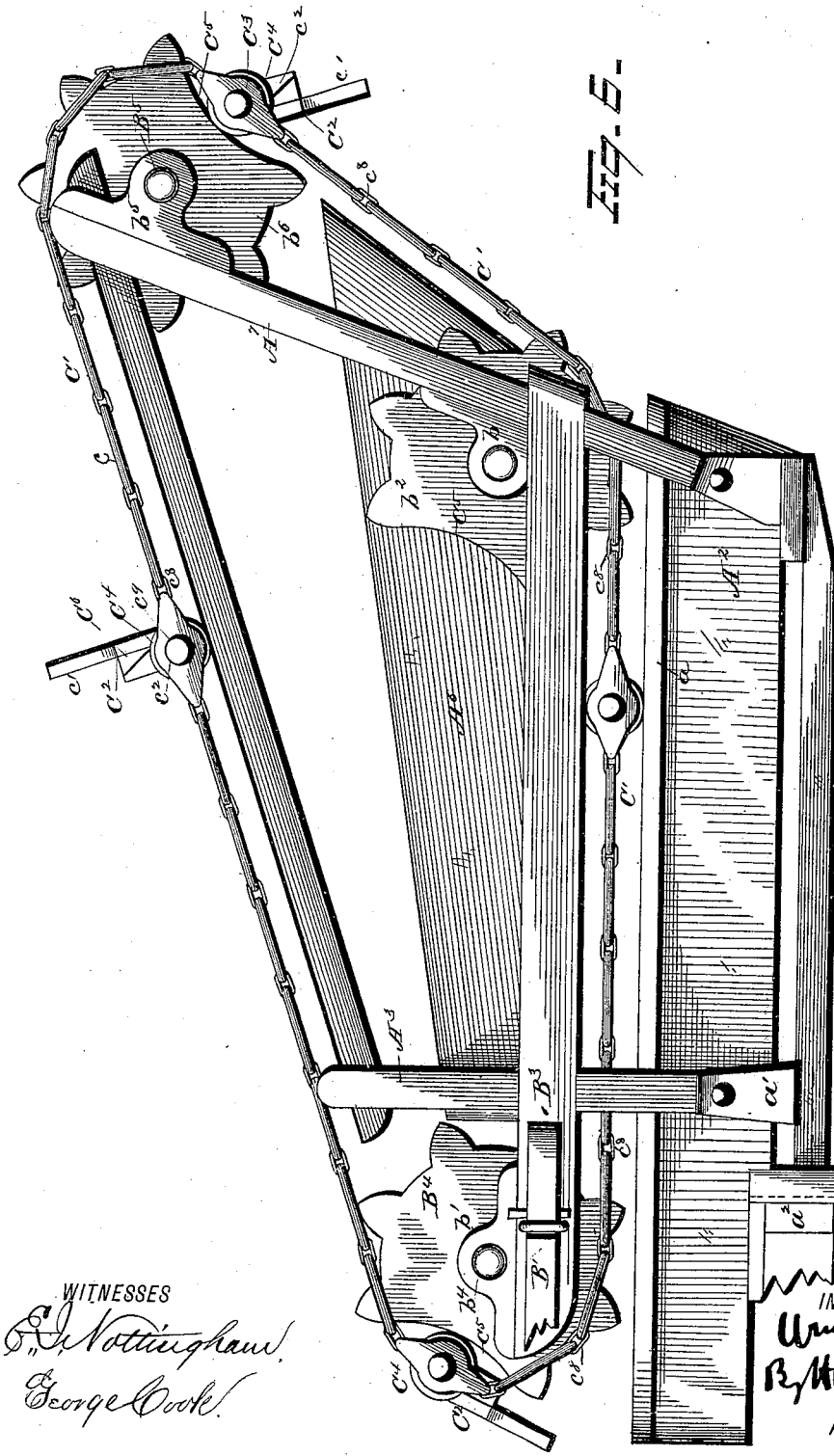
WITNESSES
E. J. Nottingham
George Cook
INVENTOR
Wm. P. Hale
By H. A. Seymour
Attorney

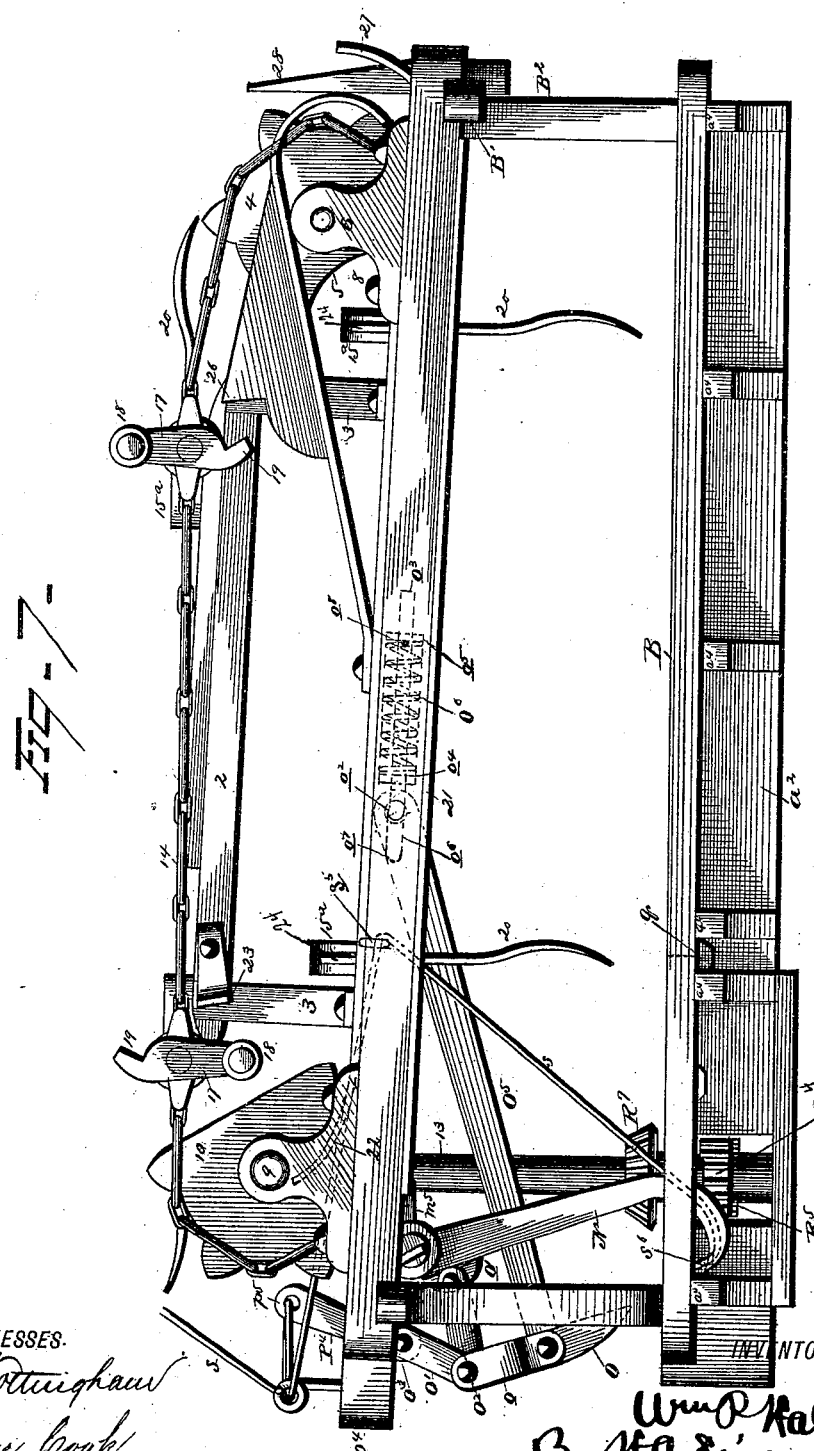

(Model.)
13 Sheets—Sheet 8.
W. P. HALE.
GRAIN BINDER.
No. 267,521. Patented Nov. 14, 1882.
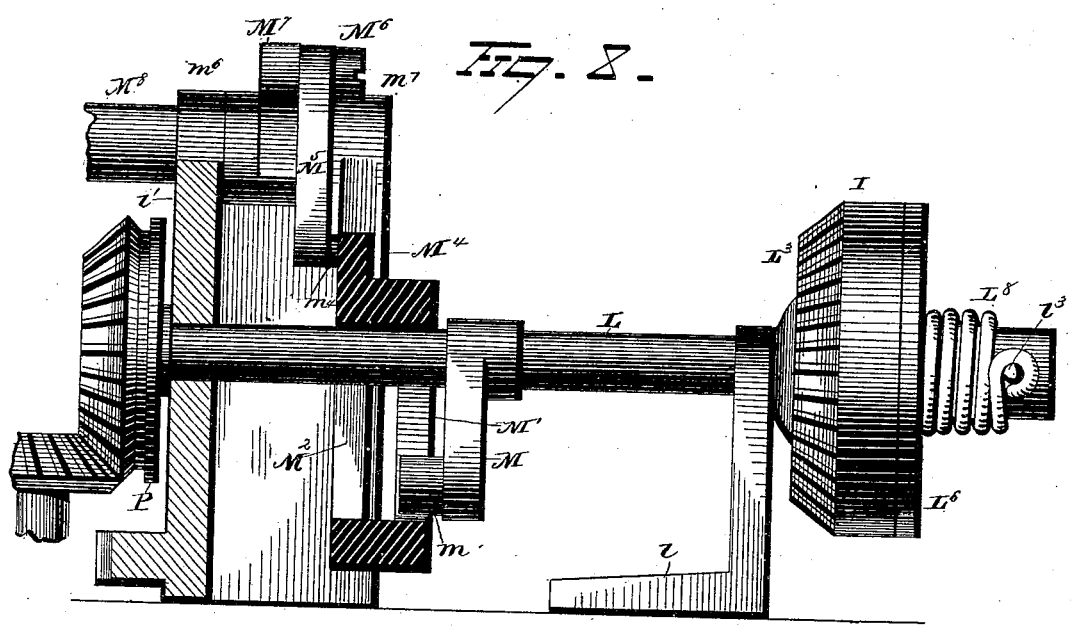
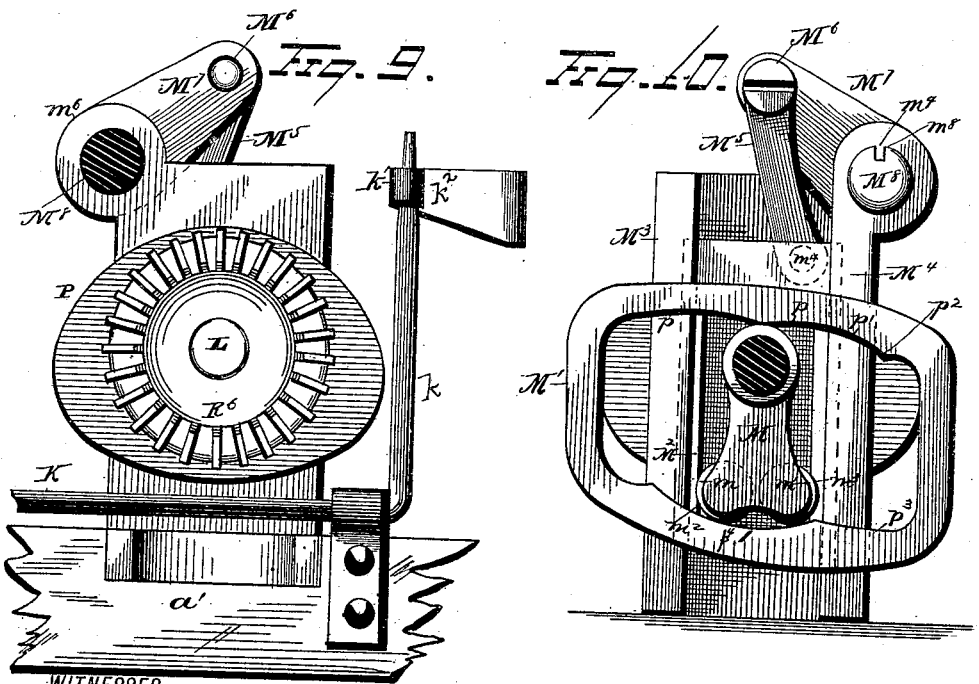
WITNESSES
INVENTOR
Attorney (Model.)
13 Sheets—Sheet 9.
W. P. HALE.
GRAIN BINDER.
No. 267,521. Patented Nov. 14, 1882.
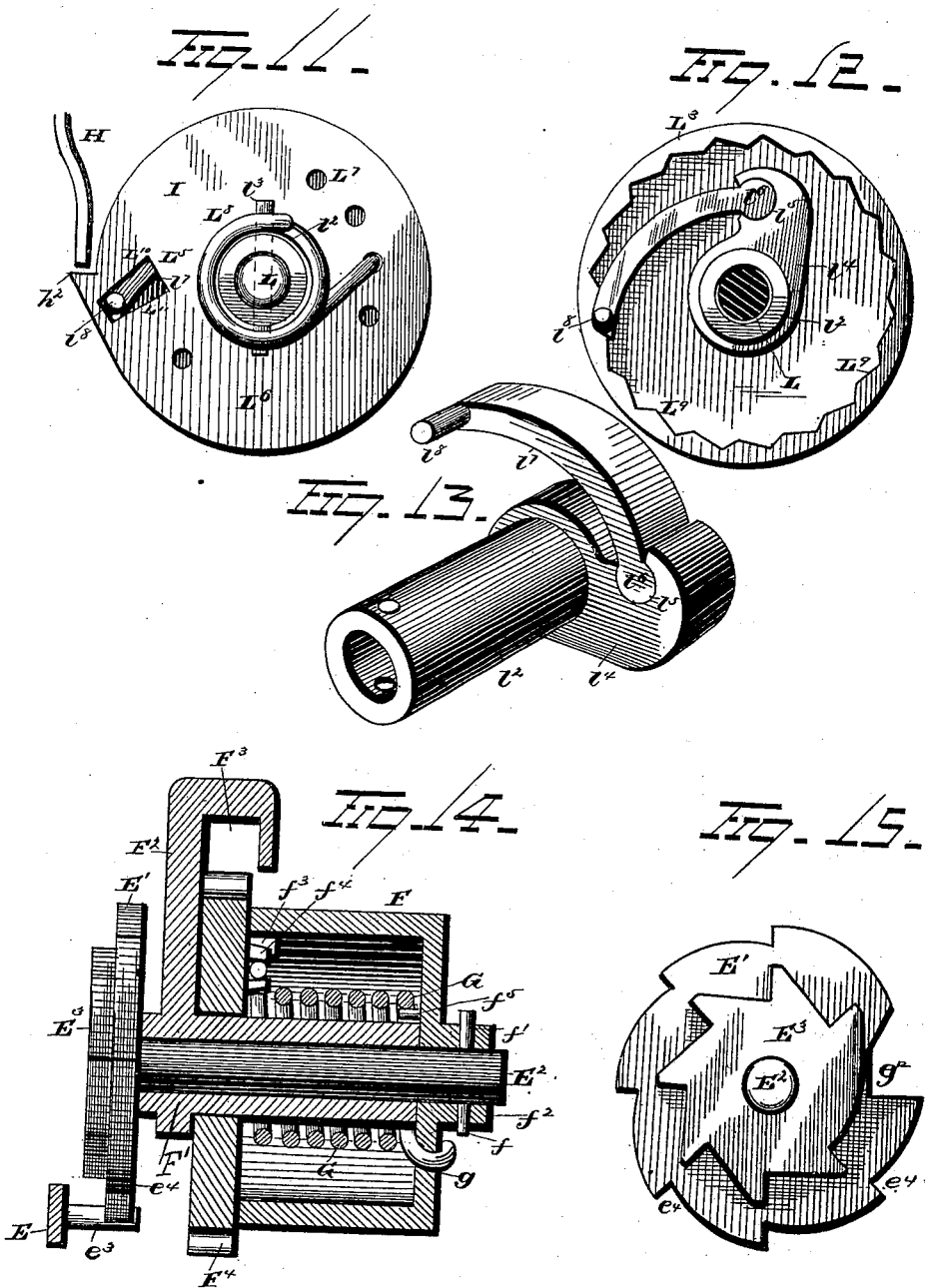
WITNESSES
E. J. Nottingham
George Cook
INVENTOR
Wm. P. Hale
By H. A. Seymour
Attorney

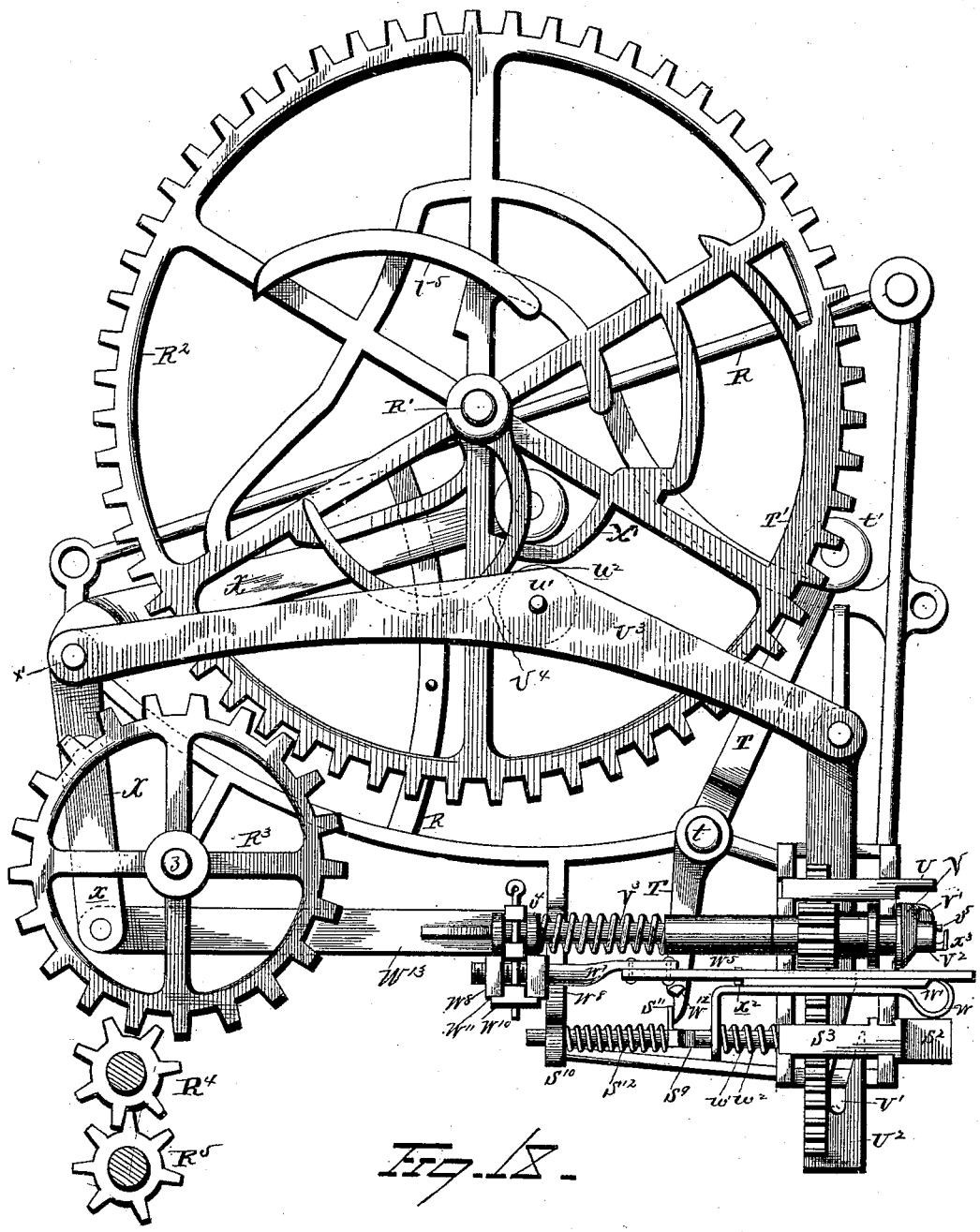

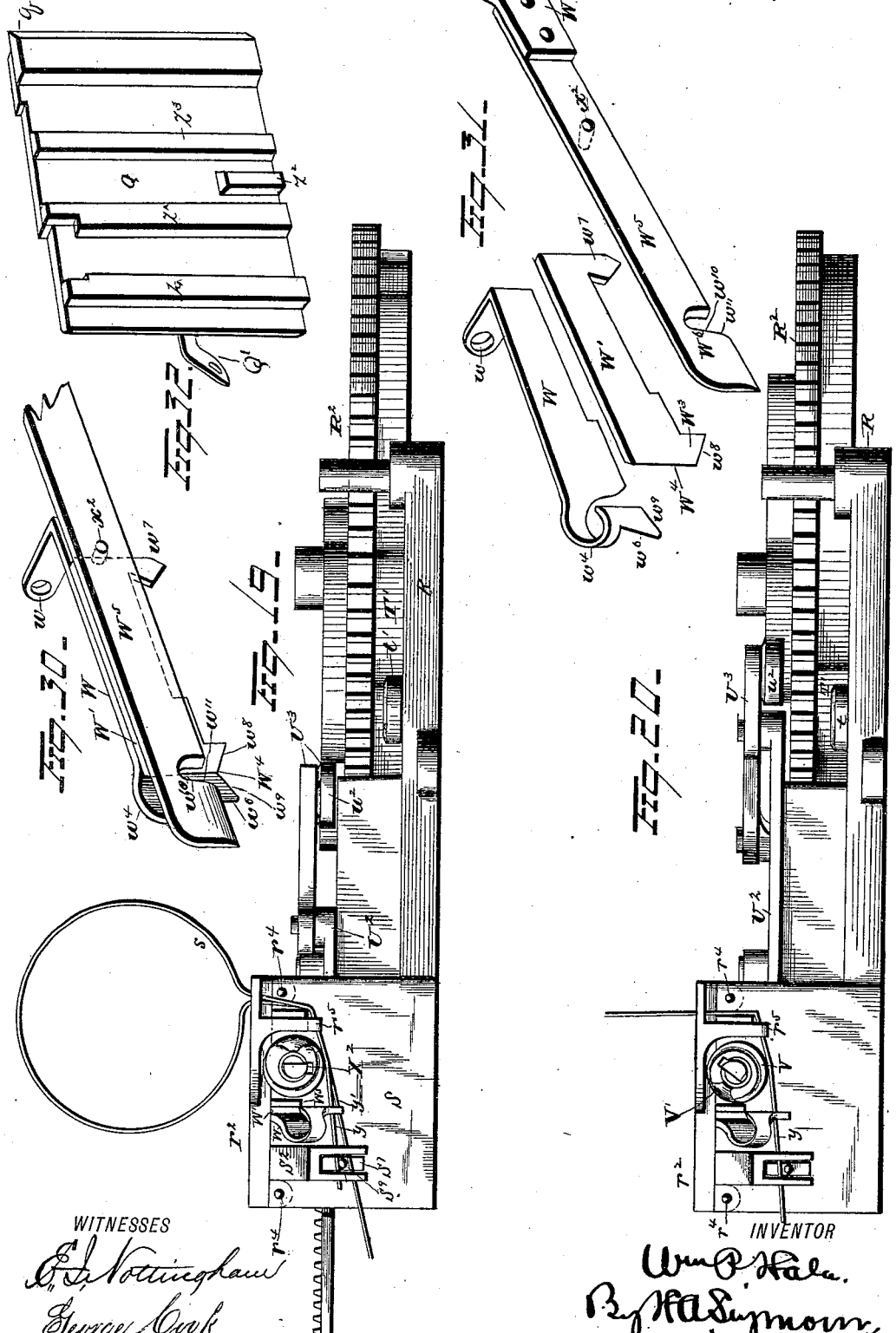

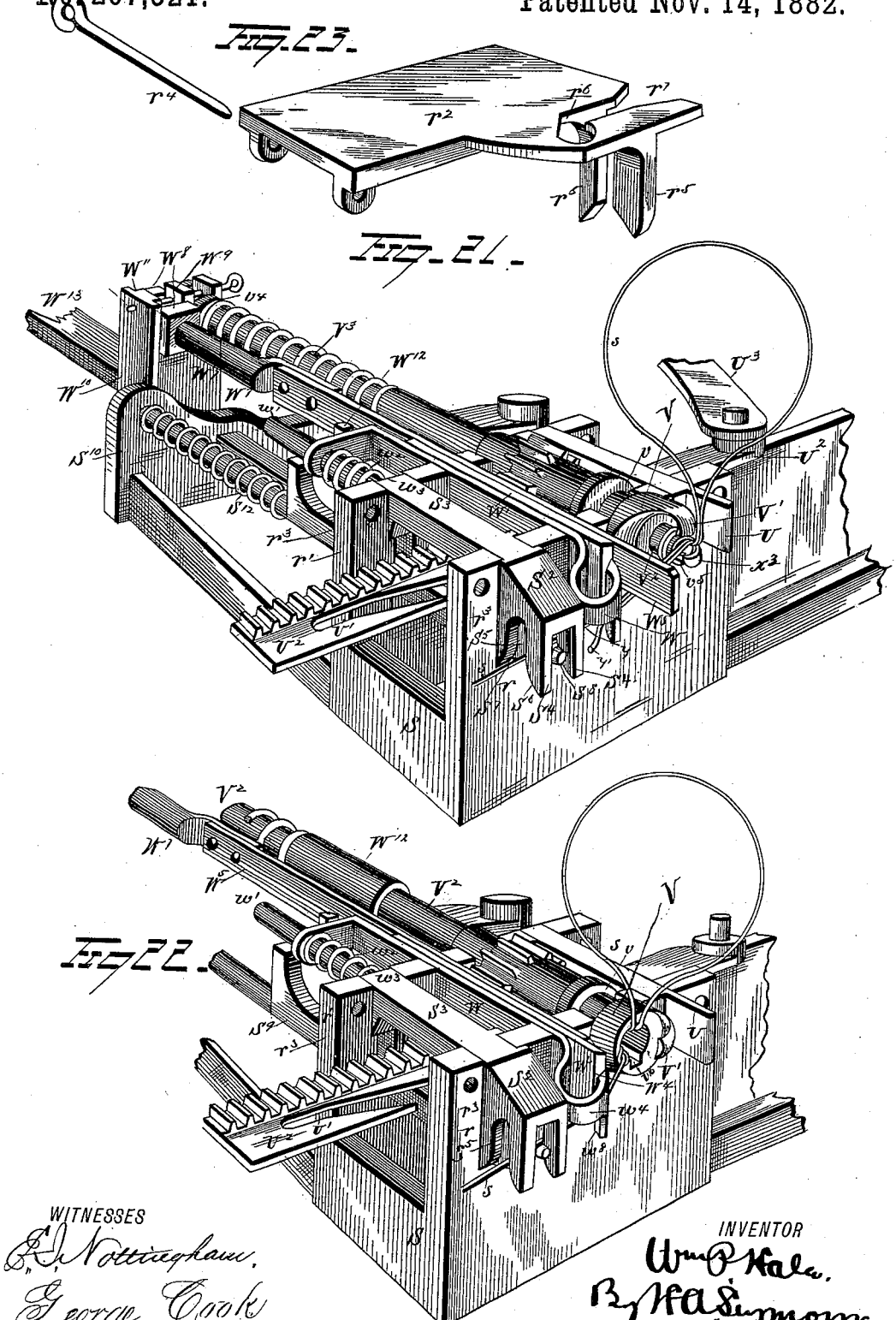

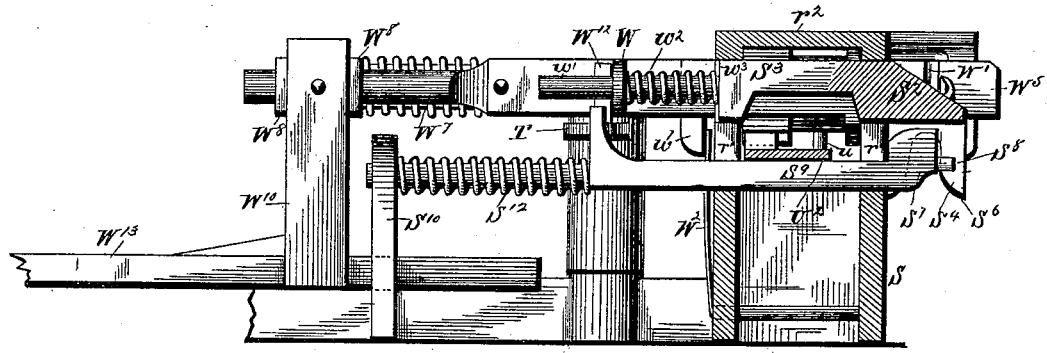

United States Patent Office.

WILLIAM P. HALE, OF BROCKPORT, NEW YORK.

GRAIN-BINDER.

SPECIFICATION forming part of Letters Patent No. 267,521, dated November 14, 1882.

Application filed April 13, 1882. (Model.)

*To all whom it may concern:*

Be it known that I, WILLIAM P. HALE, of Brockport, in the county of Monroe and State of New York, have invented certain new and useful Improvements in Grain-Binders; and I do hereby declare the following to be a full, clear, and exact description of the invention, such as will enable others skilled in the art to which it pertains to make and use the same.

My invention relates to an improvement in grain-binders.

The object of my improvement is to provide a harvester with an attachment for automatically transferring the cut grain in bundles of any desired size to improved binding mechanism, and to automatically bind and discharge the bound bundles from the machine.

With these ends in view my invention consists in certain improvements in the harvester-rakes, whereby any desired quantity of grain is accumulated on the harvester-platform and automatically transferred to the binder-platform, as will hereinafter be described, and specified in the claims.

My invention further consists in devices for regulating the operation of the harvester-rakes, as will hereinafter be described and claimed.

My invention further consists in certain features of improvement in the binder-rakes, as will hereinafter be described and claimed.

My invention further consists in certain features of improvement in the knot-tying mechanism, as will be described and claimed.

In the accompanying drawings, Figure 1 is a view in perspective of a harvester-platform having my improvement applied thereto. Fig. 2 is a plan view. Fig. 3 is a view partly in side elevation and partly in vertical section. Fig. 4 is a view in longitudinal section, showing the switch in its closed position. Fig. 5 is a similar view, showing the switch in its open position. Fig. 6 is a view in side elevation of the outer side of the platform and harvester-rakes. Fig. 7 is a view in side elevation of the binder-rakes. Fig. 8 is a detached view, partly in side elevation and partly in vertical section, of the driving-shaft, the clutch, and yoke for transmitting motion to the binding-arm. Fig. 9 is a detached view, in front elevation, of the gear for driving the binding mechanism and cam for actuating the let-off lever. Fig. 10 is a detached view of the yoke and cranks for actuating the same. Figs. 11, 12, and 13 are detached views of the clutch. Figs. 14 and 15 are detached views of portions of the switch-tripping mechanism. Fig. 16 is a detached view of one of the harvester-rakes. Fig. 17 is a similar view of one of the binder-rakes. Fig. 18 is a plan view of the knot-tying mechanism. Figs. 19 and 20 are views in side elevation of the knot-tying mechanism, showing the parts in different positions in forming the knot. Figs. 21 and 22 are views in perspective of a portion of the knot-tying mechanism, representing the parts in different positions in forming the knot. Fig. 23 is a detached view, in perspective, of the cap of the knot-tying mechanism. Fig. 24 is a longitudinal vertical section taken through the cord-grasper of the knot-tyer. Fig. 25 is a similar view taken through the rotary knot-tyer. Fig. 26 is a detached view, in perspective, of the rotary knot-tyer. Fig. 27 is a longitudinal section of the rotary knot-tyer. Fig. $27^a$ is an enlarged view in cross-section of the rotary knot-tyer. Fig. 28 is a view in perspective of the knotting-hook. Fig. 29 is a detached view of the gate or slide. Figs. 30 and 31 represent detached views of the friction cord holder and cutter. Fig. 32 is a view of the under side of the cover that fits over the knot-tying mechanism.

A represents the platform of a harvester, provided on its forward edge with a cutter-bar, A'. On the opposite sides of the platform A are secured the side pieces $A^2$, each being provided with a rail, $a$, fastened to its upper edge.

$A^3$, $A^4$, and $A^7$ are end upright frame-pieces, firmly secured at their lower ends, by brackets $a'$ or other suitable devices, to the platform, and also fastened to the side pieces $A^2$. To the upper ends of the upright frame-pieces $A^3$, $A^4$, and $A^7$ are fastened the inclined rails $A^5$. Shields $A^6$ are fastened to the inner edges of the uprights $A^3$, $A^4$, and $A^7$.

A binding-platform, B, is supported in the rear of the harvester-platform A. The binding-platform frame consists of the end beams, $a^2$ and $a^3$, and transverse beam $a^4$, firmly fastened together and adapted to support the platform B. This platform is removably secured to the rear end of the harvester-platform A in any desired manner, but preferably by hooks extending through the rear end beam $a^5$ of the harvester-platform, upon which the end beam $a^2$ is placed and supported. One end of the platform is then retained in place by a bolt extending through a post at one side of the harvester-frame, and fastened by a nut; and the outer end of the platform is secured by the rail B', secured at one end to the top of the post $B^2$, and at the other end removably fastened to the side frame-piece $B^3$. On the opposite ends of the side frame-piece $B^3$ of the rake-frame are fastened the journal-boxes $b$ $b'$.

In the journal-boxes $b$, at the forward portion of the frame, are journaled the independent sprocket-wheels $b^2$ $b^3$, while the opposite ends of the shaft $b^4$ of the reel $B^4$ are journaled in the boxes $b'$ at the rear end of the rake-frame. Journal-boxes $b^5$ are also secured to the forwardly-inclined uprights $A^7$ near their upper ends, and serve to support the opposite ends of the shaft $B^5$, to which are secured the sprocket-wheels $b^6$. The journal-boxes $b^5$ are provided with elongated slots $b^7$, through which are inserted the screws or bolts $b^8$. This construction allows the boxes to be adjusted to take up any slack in the endless chains. Thus it will be observed that there are six sprocket-wheels employed, four of which are practically in the same horizontal plane, while two of the sprocket-wheels are located at the upper portion of the rake-frame, and project over and beyond the cutter-bar, for a purpose hereinafter described.

C C' are endless chains, composed of the links $c$ $c^8$, which may be constructed and united in any desired manner. Each chain passes over three of the sprocket-wheels, and is driven thereby.

$C^2$ are the rakes, each being constructed of a rake-head, $C^6$, provided with rake-teeth $c'$. At each end of the rake-head is fastened a journal, $c^2$, by means of a bracket formed of the broad plate $c^3$, which fits against the side of the rake-head, and a flange, $c^4$, that fits against the end of the rake-head. The bracket is cast integral with the journals, and when malleated forms a strong and simple construction of rake-head journal. The rake-head journals are connected to the endless chains as follows: The endless chains C C' are each provided with as many links $C^3$ as there are rake-heads. Links $C^3$ are each formed of the side pieces $c^5$, gradually tapered from the center to the opposite ends, which are united by the cross-bars $c^6$ and $c^7$. The cross-bar $c^6$ is a simple straight bar, over which is hooked one of the small links $c^8$ of the chain, while the other cross-bar is made in the form of a hook, which latter engages the end bars of one of the links $c$. The side pieces or plates $c^5$ are provided with holes $c^9$, through which are inserted the journals $c^2$ and supported therein.

Upon the journal $c^2$, between the two side pieces of the link $C^3$, is journaled an anti-friction roller, $C^4$, of sufficiently larger diameter than the width of the side pieces to allow the rollers to travel on the supporting-rails and support the endless chain. By making the links of the form shown and described it is enabled to travel either side up, which is necessary in the present improvement. While I prefer to employ the anti-friction rollers, they are not absolutely necessary, as the links of the form and construction described would operate without the rollers. Each one of the sprocket wheels is provided with a recess, $C^5$, to allow the anti-friction rollers to enter therein as the endless chains are traveling over them. The reel $B^4$ has one of its bars $b^{12}$, which is located forward of the recess in the sprocket-wheel, placed nearer the center of the reel than the remaining bars. This construction allows the rake to travel rearward and properly pack the grain for the binder-rake to dump the grain squarely, and then allow the rake-teeth to fall within the circle of the reel. Each rake has one journal provided with a crank-arm, D, upon the outer or free end of which is journaled an anti-friction roller, D'. These crank-arms engage in the guide-way $D^2$, located at one side of the frame, and composed of the lower rail, $A^5$, and upper rail, $d$, and curved bars $d'$ $d^2$ at the forward end of the frame, the rail $a$ on the inner side pieces, $A^2$, of the harvester-platform, and an outer rail, $D^3$.

A switch-lever, E, is pivoted at $e$, the outer surface of the switch being practically flush with the outer surface of the rail $a$. The short arm $e^2$ of the switch-lever extends forward so as to form a continuation of the guide rail or bar $d'$ when the switch is open. On one side of the short arm $e^2$ is formed a projection, $e^3$, which serves as a pawl, and engages with the ratchet-teeth $e^4$ on the ratchet-wheel E' and holds the same against rotary movement in one direction. Large ratchet-wheel E' is rigidly secured to a shaft, $E^2$, to the end of which is also fastened the small ratchet-wheel $E^3$, the teeth of which engage with the outer ends of the crank-arms of the rakes when the switch is closed. To the inner end of the shaft $E^2$, or that end nearest the driver, is removably secured the spring-drum F by means of a pin, $f$, extending through a hole, $f'$, in the hub $f^2$ of the drum and through a hole in the shaft. The shaft $E^2$ is journaled in a sleeve-bearing, F', preferably cast solid with the plate $F^2$, fastened to the frame, and provided with a guide-way, $F^3$, in its upper end.

Upon the sleeve-bearing F', between the spring-drum and plate $F^2$, is loosely journaled the gear-wheel $F^4$, which has formed or secured to its inner face the stop $f^3$ and the hook $f^4$. Within the spring-drum is placed a spiral spring, G, one end of which is hooked into one of the series of holes $g$ in the end of the drum, and the outer end removably secured to the hook $f^4$ on the gear-wheel $F^4$. A pin, $f^5$, on the inner face of the end of the spring-drum prevents the spring from riding on the shaft. G' is a rack-bar, which engages with the cogs of the gear-wheel F⁴, and is retained against displacement by means of the guideway F³.

To one end of the rack-bar is secured a notched bar, G², the notches $g^2$ of which engage with the teeth of the cog-wheel G³, attached to the shaft G⁸, the opposite end of which has a hand-wheel, G⁹, attached thereto, said hand-wheel being provided with the notches G¹⁰ G¹¹, within which the spring-lever G¹² engages and locks the hand-wheel in any desired position.

To the long arm $g^2$ of the switch-lever E is attached a pin, $g^3$, which extends through an elongated slot, $g^4$, in the frame. Upon the outer end of the pin $g^3$ bears one end, $g^5$, of a spring, G⁴, which is secured to a staple, G⁵, fastened to the frame, the outer end, $g^6$, of which is provided with a hook, $g^7$, which bears against the under side of the arm $h$ of the trip-lever H. The rear arm, $h'$, of the trip-lever is provided with an inclined plate, H', which projects inwardly under the outer end of the rail D³ of the guideway. The other end of the trip-lever H engages a projection or stop, $h^2$, on the clutch I. The rake-journal engages the inclined plate H' and trips the lever H, thereby throwing the binding mechanism into operation by the action of the clutch hereinafter described.

Upon the harvester-frame is supported, in suitable bearings, a rock-shaft, J, having a crank-arm, $i$, on its outer end, to which is attached a push-rod, J', extending through the foot-board J², and thus adapted to be operated by the foot of the driver. The inner end of the rock-shaft is furnished with a crank-arm, $i'$, which is attached to an eye, $i^2$, in the lower end of a spring-rod, $i^3$. Upon the arm $i^4$ of the spring-rod is attached one end of a slide-bar, J³, the other end of which is provided with an elongated slot, $i^4$, through which is inserted a screw or pin, $i^5$, on the side bar A². The end of the sliding bar is beveled, as at $i^6$. When pressure is applied to the push-rod J' the sliding bar is moved rearwardly, so that its beveled end $i^6$ will move beneath the pin $g^3$ of the switch-lever and hold it in a raised position against the pressure of the spring G⁴, and prevent the switch from shifting the rake, which would otherwise engage the grain, thus enabling the driver to govern the operation of the rakes should the machine pass over a spot having little or no grain thereon.

K is a rock-shaft, preferably journaled on the harvester-frame in rear of the driver's seat K', and provided with an operating-lever, K², which extends upwardly within easy reach of the driver. The operating-lever may be secured in any desired adjustment by means of the sector-rack K³. The outer end of the rock-shaft K is provided with an arm, $k$, which engages in a loop or eye, $k'$, attached to the adjustable rail $k^2$, the lower edge of which engages with the friction-rollers of the rake-arms employed in carrying the grain back to the binders' platform.

On the binder-platform is mounted the binder rake-frame, consisting of the lower rails, 1, and upper rails, 2, the latter being supported by suitable uprights, 3, attached to the lower rails. At the outer ends of the lower rails, 1, are supported the independent sprocket-wheels 4, each of which is provided with a recess, 5. These sprocket-wheels are mounted in bearings 6, which are provided with elongated slots 7, (see Fig. 2,) through which are inserted the fastening screws or bolts 8, and thus the bearings are made adjustable to make up for any wear of the rake-chain. At the inner ends of the lower rails is supported the transverse shaft 9, on which are mounted the sprocket-wheels 10. The shaft has a bevel-gear wheel, 11, secured to one end thereof, which meshes with a large bevel-gear, 12, fastened to the upper end of the upright shaft 13, and by means of which motion is imparted to the binder-rake. Rake-chains 14 encircle the sprocket-wheels 4 10, and are driven thereby.

At suitable distances apart in the rake-chain are located the binder-rakes 15, which are constructed and operated as follows, (see Fig. 17:)

15ᵃ represents the rake-head, which is made in the form of a crank, having its ends 15ᵇ constituting journals, which are supported in the bearing-links 16, the latter being constructed similar to those employed in the harvester-rake. To the outer end of one of the journals of the rake-head is fastened a bar, 17, having an anti-friction roller, 18, journaled upon a stud or pin projecting outwardly from said bar. The opposite end of the bar is provided with a finger, 19. The rake-teeth 20 are located in a vertical position during the travel of the rake across the binder-platform, and rake-chains and rake being supported by the rails 21, projecting inwardly from the lower rails, 1. The rake is retained in its upright position by means of the bar or arm 17, the ends of which rest upon the rail on opposite sides of the journal. After the rake has delivered the grain against the binding-cord and the binding arm has descended and grasped the outer side of the bundle of grain, the anti-friction roller 18 engages with the inclined trackway 22, and thus retains the rake-teeth in a vertical position while they are being raised and until they are out of contact with the grain. As the rake is then carried outwardly or backwardly the lower portion of the bar or arm 17 strikes a projection, 23, attached to the upper rail, which serves to impart a quarter turn or revolution to the rake. When the rake has traveled a little farther the projection 24 on the rake-head (see Fig. 1) comes in contact with the inner end of the rail 25, which operates to impart another quarter turn or revolution to the rake, in which position it travels until it has nearly reached the outer ends of the rail, when the finger 19 strikes the projection 26, (see Fig. 7,) thereby imparting another quarter-turn to the rake, causing it to assume a vertical position, in which it is held by means of the friction-roller 18 entering the curved trackway 27 and the rake-head engaging with the upright 28. The rakes are thereby caused to descend vertically and engage the grain and carry it to the binding mechanism.

Having described the construction and arrangement of parts of the harvester and binder-rakes, I will now proceed to describe the operation of these parts.

As the harvester is drawn forward through the grain the harvester-rakes will descend vertically into the standing grain and hold it while it is being severed by the cutter. By arranging the upper sprocket-wheels so as to project in front of the cutter-bar, and the lower sprocket-wheels practically in the same vertical plane with the cutter-bar, the harvester-rakes will, by suitable driving-gears, be moved rearwardly through the same space as that through which the machine progresses during any given period of time, so that the rakes are caused to descend vertically into the grain. All of the rakes move down nearly in contact with the forward edge of the harvester-platform, and all are retained in a vertical position and move rearwardly a certain distance, so as to carry the grain backward onto the platform.

As it is desirable to form the bundles of uniform size, provision is made for causing every fourth, fifth, or sixth rake to carry the grain rearwardly to the binder-platform, according to the varying yield of the land. When the grain is heavy the parts are adjusted so as to cause every fourth rake to transfer the accumulated grain on the harvester-platform rearwardly and deposit it upon the binder-platform. Should the grain be lighter, every fifth, sixth, or seventh rake may be caused to perform this office. Assume that the parts are adjusted so that every fourth rake shall engage the grain and transfer it to the binder-platform, the operation will be as follows: The first rake will descend vertically, then move in a horizontal direction over the harvester-platform a short distance. The anti-friction wheel on the crank-arm of the rake traverses the upper surface of the short arm $e^2$ of the switch, and the end of the crank-arm on the rake engages one of the teeth of the ratchet-wheel $E^3$ and turns the shaft $E^2$ and large ratchet-wheel $E'$, attached thereto, and as the latter rotates a distance equal to one of its teeth the pawl or projection $e^3$ on the short arm of the switch enters back of the tooth, it being thrown upward by the spring $G^4$, which engages the projection on the long arm of the lever, as before described, and thus prevents the ratchet from rotating in the opposite direction. The anti-friction roller on the crank-arm of the rake, after it leaves the short arm of the switch-lever, travels upon the rail $D^3$, thus imparting a partial rotation to the rake-head and raising its teeth clear of the grain, as seen in Fig. 4. In this way two of the rakes are operated, and as each one passes the switch the ratchet-wheel is turned a single tooth. When the third rake passes the switch the crank-arm engages with the ratchet-wheel and imparts a partial rotation thereto, and brings the deep notch $g^{12}$ of the large ratchet-wheel $E'$ around, so that the projection $e^3$ on the short arm of the switch may enter therein, and thus open the switch. The third rake, like the two first, is turned so that its rake-teeth will not engage the grain. Now comes the fourth rake, and, instead of the crank traveling on the upper surface of the short arm of the switch, it enters beneath the short arm of the switch, which, as just stated, has been thrown up out of the way into the deep notch $g^{12}$ by the spring $G^4$, and as it engages beneath the long arm of the switch the short arm is depressed, disengaging it from its ratchet and allowing the latter to be rotated back to its original position by the action of the spring $G$ in the drum $F$. Thus the switch is again closed and the crank-arm of the rake engages the under side of the guide-rail $D^3$ and holds the rake in proper vertical position for transferring the accumulated grain to the binder-platform. When every fourth rake is in operation the rack-bar $G'$ is adjusted so that the stop on the gear-wheel $F^4$ will allow the drum $F$, attached to the shaft carrying the ratchet $E'$, to rotate backward a distance equal to four of the ratchet-teeth, when the projection $f^3$ on the drum strikes the projection $f^4$ on the gear-wheel and arrests further movement of the ratchet. Now, if it is desired that every fifth rake should operate, the rack-bar is drawn rearwardly by imparting a half-rotation to the hand-wheel provided for that purpose. The hand-wheel is then locked against accidental displacement, and in this position the stop on the gear-wheel is in position to allow the large ratchet to rotate backwardly a distance equal to five of its teeth. In this manner the switch may be set so that either the fourth, fifth, sixth, or seventh rake may operate to rake the grain back to the binder-platform.

It will be observed that the switch is not changed until the ratchet $E'$ has been moved step by step, each rake moving it a single tooth, and the deep notch brought into position to allow the projection on the short arm of the switch to enter therein and close the switch.

From the foregoing explanation it will be observed that the driver, without moving from his seat, can quickly and easily govern the operation of the rakes so as to insure uniformity in the size of the bundles.

In the construction of grain-binders it is desirable to provide means for regulating the position of the cut grain on the binder-platform relative to that of the binding-cord, so that the grain shall always be presented midway its length to the binding-cord regardless of the length of the grain.

I will now proceed to describe the operation of my improved construction and arrangement of parts for delivering short or long grain upon the binding-platform, so that it shall be bound centrally by the cord or twine.

When the machine is operating on heavy grain the operating-lever $K^3$ is secured within the forward notch in the lever-holding plate, in which adjustment the rear end of the adjustable rail $k^2$ is flush with the rear end of the stationary rail $D^3$. Hence when the anti-friction roller on the crank-arm of the operating-rake reaches the end of the stationary rail the rake is allowed to turn on its bearing and rise vertically, and thereby be disengaged from the grain. When the grain is very short the operating-lever is secured in the rear notch of the plate, in which adjustment the adjustable rail $k^2$ is moved rearward, so as to form an extension of the rail $D^3$, and thus retain the rake in its raking position for a greater length of time and transfer the grain a greater distance rearward on the binder-platform. By these devices the driver may readily adjust the parts so that the rakes will drop the grain at the proper point on the binder platform, so that when engaged by the binder-rakes it will be carried centrally to the binding-cord. After the grain has been deposited on the binder-platform it is carried against the binding-cord by the transversely-moving binder-rakes, and while the grain is held between the binding-cord on one side and the rakes on the other side the binding-arm descends and carries the cord around the bundle, and at the same time the rake rises out of contact with the bundle and is carried back again to the proper position for delivering another supply of grain to the binder.

L is a shaft, journaled in bearings $l\ l'$, attached to the harvester-frame, and is driven by a bevel-gear, $L'$, mounted on the shaft $L^2$, to which the driving wheel $L^{12}$ of the harvester is secured. The driving-wheel $L^{12}$ is provided with an internal gear, $L^{13}$, into which meshes the pinion $L^{14}$. To the shaft on which the pinion $L^{14}$ is secured is attached a sprocket-wheel, $L^{15}$, for imparting motion to the cutter-knife and also to the harvester-rakes through the chain $L^{16}$.

The harvester-tongue $L^{17}$ is constructed with hounds—one on each side of the drive-wheel—with eye-sockets attached to each journal-box of the drive-wheel.

The bevel-gear $L'$ meshes with the bevel-gear $L^3$ of the clutch I, which is constructed as follows:

$l^2$ is the clutch-sleeve, which is fastened to the shaft L by a pin, $l^3$, or other suitable device. Sleeve $l^2$ is constructed with an outwardly-projecting arm, $l^4$, having a circular recess or groove, $l^5$, in its outer end, in which fits the circular bearing $l^6$ on one end of the pawl $l^7$, the latter being provided with a stud, $l^8$, on its outer or free end, which projects through the opening $L^5$ in the disk $L^6$, which latter is loosely mounted on the sleeve $l^2$. The disk $L^6$ is provided with a series of holes, $L^7$, into any one of which is hooked one end of the spiral spring $L^8$, the opposite end of which is hooked to the pin $l^3$. The bevel-gear $L^3$ is provided with a sleeve or drum having V-shaped teeth or notches $L^9$ on its inner circumference. The opening $L^5$ in the disk is formed with the two inclined sides $L^{10}$ and $L^{11}$. The spiral spring serves to rotate the disk $L^6$ on the sleeve $l^2$, thereby causing the inclined side $L^{11}$, with which the stud $l^8$ engages, to move the latter outward and into engagement with one of the notches $L^9$ in the drum of the bevel-gear $L^3$, and thereby lock the latter to the clutch-sleeve $l^2$, and cause it to rotate therewith, and thus impart rotary motion to the shaft L. The periphery of the disk $L^6$ is provided with a projection, $h^2$, which engages with the end of the trip-lever H, causing the inclined side $L^{10}$ to engage the stud $l^8$ and move it downward out of contact with the notches $L^9$, and thereby enable the gear-wheel $L^3$ to continue to revolve without rotating the shaft L.

On the shaft L is secured an arm, M, provided with the two arms $m\ m'$, on each of which are journaled the anti-friction-rollers $m^2\ m^3$, thereby constituting a double crank, as will be explained.

$M'$ is a cam-yoke having a slide, $M^2$, secured thereto, which moves vertically in the guideways $M^3\ M^4$.

To the slide $M^2$ is secured a pin, $m^4$, in which is journaled one end of a connecting rod or link, $M^5$, the opposite end of which is journaled on the wrist-pin $M^6$ of the crank $M^7$, which is secured to the binding-arm shaft $M^8$. The binding-arm shaft $M^8$ is supported at its outer end in the bearing $m^5$ and at its inner end in the bearings $m^6\ m^7$, the crank $M^7$ being located between the latter. Shaft $M^8$ is provided with a longitudinal groove, $m^8$, in which engages a spline or feather, $m^9$, in the hub of the crank, whereby the shaft may have a longitudinal movement, and hence prevent any binding of the parts due to the yielding of the binding-platform or uneven shrinkage of the timbers composing the harvester and binding platforms.

To the outer end of the shaft $M^8$ is fastened the binding arm or needle N.

A compressor-arm, O, is located below the shaft $M^8$ and in line with the binding-arm and opposite the same.

To one side of the compressor-arm is secured an arm, $o$, between the upper end of which and the upper end of the binding-arm are pivoted the ends of the two links $O'\ O^2$, the upper end of the link $O'$ being pivoted to the hanger $O^3$, secured to the rail $O^4$, while the end of the link $O^2$ is pivoted to a flange, $o'$, formed on the binding-arm and projecting rearward therefrom.

To the compressor-arm is pivoted one end of a yielding bar, $O^5$, the opposite end of which is attached to the arm $o^2$ of a yielding rod, $o^3$, mounted in the bearings $o^4\ o^5$, secured to the rail $O^4$. The arm $o^2$ extends into a groove, $o^6$, in the rail, the end $o^7$ of the groove serving as a stop to limit the forward movement of the compressor-arm. A spiral spring, $O^6$, encircles the rod $o^3$, one end of the spring resting against the bearing $o^4$ and the outer end against a pin, $o^3$, inserted through the rod $o^3$. By these means the compressor-arm is allowed to yield for bundles of varying size.

The cam-yoke M is of peculiar form for accomplishing certain results in connection with the double crank, as will be explained. The binding mechanism is out of gear until the grain has been raked backward onto the binding-platform, it being retained out of gear by the end of the trip-lever H bearing on the projection of the clutch-disk I. When the rake has carried grain to the proper position on the binding-platform the crank-arm of the rake engages the long arm of the lever H and depresses it, thereby raising the short arm and disengaging it from the pin $h^2$ on the clutch-disk I, and thus causing the clutch-disk to be partly rotated by the spiral spring, and thus locking the bevel-gear to the clutch and imparting rotary movement to the shaft L. As the double crank on the shaft L rotates the roller $m^2$ on the crank-arm $m$ engages the curved portion or trackway $p$ of the yoke and raises the same, thereby imparting a partial rotary movement to the binding-arm shaft and raising the binding-arm, and also raising the compressor-arm, said arms being moved in opposite directions. The compressor-arm is raised by means of the link $O^2$, which is drawn forward by the binding-arm, thereby opening the toggle-joint formed by the compressor-arm and links $O' O^2$ and raising the compressor-arm, as stated. The binding and compressor arms will be retained in their elevated position while the rollers $m^2 m^3$ are traveling against the two curved trackways $p p'$. The roller $m^3$, in traveling on the trackway $p$, serves to uphold the binding and compressor arms, and as the roller $m^3$ leaves the trackway $p$ the roller $m^2$ engages the trackway $p'$ and serves to uphold the binding and compressor arms until the roller $m^3$ reaches the point $p^2$, at which time the binder-rake will have delivered the bundle of grain to the binder-arm and in proper position for binding. As the roller $m^3$ leaves the point $p^2$ the roller $m^2$ instantly engages the portion $p^3$ of the yoke and forces it downward quickly, and thereby forces the binding-arm downward around the bundle by a quick movement. As the binding-arm descends the link $O^2$ opens the toggle-joint by forcing the upper end of the compressor-arm rearward and its lower end forward, so that these parts will be in the position illustrated in Fig. 7. The grain is now compressed between the binding-arm and compressor-arm, and now the knot-tyer commences to operate, and while tying the knot the binding and compressor arms are retained in a stationary position, as the portion $p^4$ of the yoke is so formed that the crank-arms do not engage therewith in a manner to actuate the yoke, except at certain intervals of time. The crank-arms rotate with the shaft until the roller $m^3$ has nearly engaged with the upper portion of the yoke again preparatory to again actuating the binder and compressor arms, when the projection on the clutch-disk strikes the trip-lever, thereby throwing the bevel-gear $L^3$ out of engagement with the clutch and allowing it to revolve loosely until the trip-lever is again tripped by the rake, when the parts are again put in operation.

On the shaft L, near its rear end, or formed integral with the bevel-gear secured thereto, is a cam-disk, P, with which engages an anti-friction roller, P', journaled on the lower end of the crank $P^2$ of the rock-shaft $P^3$, the opposite end of which is provided with a let-off arm, $P^4$, provided with an eye, $p^5$. When the needle or binding arm has carried the twine around the bundle and the twine is grasped by the tyer, the eye of the let-off arm or lever will be in its retracted position, and as the knot is being formed the anti-friction roller, traveling on the cam-disk P, allows the let-off arm or lever to recede gradually and let off the twine to the tyer to furnish sufficient length of twine to form the knot.

Having described the construction and operation of the raking and a portion of the binding mechanism, I will now proceed to describe the knot-tyer.

The binding-platform is provided with a removable section, Q, one end of which is provided with a cleat, $q$, that fits beneath the binding-platform, for holding it in place, while the other end is provided with a hook, Q', or hasp and staple, by which it is fastened in place. The knot-tyer is located beneath the removable section Q, the latter forming a cover for the knot-tying mechanism, so that access may be readily had thereto for lubricating, cleaning, or repairing any of the several parts of the tying mechanism.

R is a skeleton frame, provided with a stud, R', on which is journaled the large cam-gear wheel $R^2$, which is driven by the intermediate gears, $R^3$, $R^4$, and $R^5$, the latter being attached to the lower end of the upright shaft 13, which in turn is driven by the shaft L by means of the bevel-gears $R^6 R^7$. This large cam-gear $R^2$ imparts the proper motion to the different parts of the knot-tyer, as will be explained.

S is a box or frame, consisting of the plates $r r'$, preferably cast solid with the frame or cover, provided with perforated lugs $r^3$, through which are inserted the pins $r^4$ for securing the cap $r^2$ in place in a readily detachable manner. The cap $r^2$ is provided with two depending jaws, $r^5$, between which the twine is led to the rotary tyer, and also with the slot $r^6$ and opening $r^7$, to enable the cord to be carried to the proper position for tying. The twine $s$ passes from the ball in the box $s'$ under the cord-guide $s^2$ and through the loop $s^3$, then through the thread eye $p^5$ in the let-off lever, back through the loop $s^4$, then through the loop $s^5$ on rail $O^4$, and from there through the eye $s^6$ of the needle or binding arm, and from there to the grasping device $S^2$, which latter device is constructed as follows:

S³ is a shank seated in the slots formed in the plates $r$ $r'$. The outer end of the shank is constructed with the downwardly-projecting jaws S⁴, which latter are slotted, as at S⁵, and beveled, as at S⁶, on their lower faces. Between the jaws S⁴ reciprocates a grasping-head, S⁷, constructed with an outwardly-projecting pin, S⁸, the latter forming a support for the twine when the grasping-head is retracted. The grasping-head S⁷ is made integral with or attached to the sliding bar S⁹, the rear end of which is supported in the bearing-plate S¹⁰. On the sliding bar S⁹ is formed a stop, against which bears one end of a spiral spring, S¹², that encircles the bar, the other end of the spring resting against the bearing-plate S¹⁰, said spring serving to move the bar forward.

T is a lever pivoted on the stud $t$ of the frame R. The short arm of this lever engages with the stop S¹¹ on the sliding bar S⁹. The long arm of the lever T has an anti-friction roller, $t'$, journaled on its end, which engages with the cam T' on the cam-gear, thereby throwing the long arm of the lever away from the center of the cam-gear, and thus moving the short arm in the opposite direction and retracting the sliding bar S⁹. When the sliding bar is in its retracted position the binding-twine can enter the slots S⁵, formed in the jaws S⁴, and when the roller $t'$ leaves the cam T' the spring S¹² throws the sliding bar forward, thereby causing the grasping-head S⁷ to firmly secure the twine between its sides and the inner surfaces of the jaws S⁴, as clearly shown in Fig. 19. As the binding-arm is carried upward it carries with it the twine, which runs through the eye in the end of the arm, carrying it into a friction-holder, W W', and thence upward until the binding-arm reaches its raised position, and as it rises the twine is brought against a gate, U, which, being forced outward, closes the space between the two depending jaws $r⁵$ and prevents the thread from entering therein, until the rotary tyer has been rotated to the proper position, when the gate or slide U is retracted as follows: Upon the under side of the gate or slide U is a pin, $u$, which enters a cam-shaped slot, U', formed in the reciprocating rack U², one end of which is pivoted to the outer end of the lever U³, journaled upon the stud $u'$.

To the arm or lever U³ is journaled an anti-friction roller, $u²$, which engages the outer surface of a cam, U⁴, that serves to move the rack-bar outward, and is moved inward by the roller $u²$ engaging the inner surface of the cam U⁵. As the rack-bar U² moves in one direction it imparts a transverse movement to the other slide or gate in one direction and closes the thread-opening leading to the rotary tying-bill, and when the rack-bar moves in the opposite direction the slide or gate is moved in the opposite direction and opens the passage for the thread to the tying-bill. The slide or gate U being retracted, the twine passes through the slot or opening $r'$ and moves into the hook V', which extends outward from the rotary head V, which latter is provided with an annular groove, $v$, within which engages the bearing $v'$ (see Fig. 25) of the supporting-plates, thereby enabling the head to be rotated and yet prevented from any endwise movement thereof. The rotary head is provided with cog-teeth, which mesh into the teeth of the rack U², by which it is rotated. When the twine has passed into the bill V' the parts are in the position shown in Fig. 20 and the grain is raked against the twine. The bill remains stationary while the cam-gear continues to revolve, and the binding arm or needle descends, the latter carrying the twine over the bundle and downward between the jaws of the twine friction-holder, which is at this time in its open position, and which is constructed and actuated as follows:

W is a plate, the rear end of which is bent at right angles to its length, and provided with a hole, $w$, within which engages the shank $w'$ of the grasper S². A spiral spring, $w²$, encircles this shank, one end of the spring resting against the shoulder $w³$ of the grasper and the other end resting against the bent end of the plate W. The forward end of the plate is curved outward, as at $w⁴$, to give ample clearance-space for the escape of the waste pieces of twine. From the end of the loop or curved portion $w⁴$ a jaw, $w⁶$, extends downward, and is beveled, as at $w⁹$, on its lower edge.

W' is the other plate of the friction-holder. Its rear end is constructed with a depending projection, $w⁷$, against which presses a spring, W², Fig. 24, that serves to retract the plate. The forward end is provided with a depending stop, W³, that engages the frame $r$ and limits the rearward movements of the plate W', said stop being beveled at $w⁸$ to correspond with the beveled portion $w⁹$ on the jaw of the plate W, whereby the cord is guided into the space between the jaws when in their open position. Upon the forward end of the plate W' is formed a knife-edge, W⁴, which constitutes one blade of the shear, W⁵ being the plate constituting the other blade. The forward end of the plate W⁵ is provided with a notch, W⁶, in its lower edge. One side of this notch is inclined, as at $w¹⁰$, and beveled to form a knife-edge, $w¹¹$, the other side being square, so as to push out the cord, for a purpose afterward stated.

To the rear end of the plate W⁵ is attached a screw-threaded shank, W⁷, on which are secured two nuts, W⁸. The thread-shank is supported in a slot, W⁹, in the bracket W¹⁰. The nuts W⁸ fit against the flange W¹¹, whereby they are prevented from turning. By adjusting the nuts the plate W⁵ may be longitudinally adjusted to compensate for any cutting away of the shear-blades in sharpening, and when once adjusted the nuts are kept from displacement in the manner stated. The plate W of the friction-holder is forced outward by means of the lever T, which is provided with a projection, W¹², that engages the rear end of said plate. The spring $w^2$ serves to move the plate W in the opposite direction. The plate $W^5$, together with the rotary knot-tyer, is reciprocated by the following devices: The bracket $W^{10}$, with which the plate $W^5$ and shaft of the rotary knot-tyer are connected, is formed integral with or attached to the sliding bar $W^{13}$, the rear end of which is pivoted to the short arm $x$ of the bell-crank lever X, which latter is journaled in a stud, $x'$, and has an anti-friction roller journaled on its outer or free end, which engages with the irregular-shaped cam $X'$ on the cam-gear. The plate $W'$ is moved forward with the plate $W^5$ during a portion of the movement of the latter by means of a pin, $x^2$, projecting out from plate $W^5$, which strikes the rear end of plate $W'$ and moves it forward. The rotary knot-tyer consists of the rotary head V, which fits upon the cylinder $V^2$. A sliding shaft, $V^3$, is inserted in the rear end of the cylinder $V^2$, and is held in engagement therewith by means of the tying-hook, the rear end of which is provided with a hook, $v^2$, that passes through a hole, $v^3$, in the adjacent end of the sliding shaft $V^3$, one end of the spring resting against the rear end of the cylinder $V^2$ and the other end against a collar, $v^4$, whereby the function of the spring is to retract the shaft and the tying-hook. Cylinder $V^2$ is constructed with a groove, $v^6$, the depth of which is considerably in excess of the width of the shank or bar of the tying-hook, which is inserted therein, in order to form sufficient space for the spring $v^5$, one end of which is attached to the shank of the tying-hook, while the free end of the spring rests on the bottom of the deep groove. Cylinder $V^2$ is notched, as at $v^7$, to form flat bearings for the plate $v^8$, attached to the shank of the tying-hook, and serving to support the same and retain it in the outer portion of the groove $v^6$. The outer end of cylinder $V^2$ is recessed, as at $v^9$, (see Fig. 25,) so that when the tying-hook $X^2$ is in its retracted position its outer surface will be practically flush with the end of the cylinder, and thus allow the string to slip off without danger of catching. Tying-hook $X^2$ is constructed with a semicircular flange, $x^3$, to enable it to grasp the twine as quickly as possible when the hook is rotated. Rotary head V is constructed with a longitudinal groove, $v^{16}$, in which is received that portion of the shank of the tying-hook that projects outward from the cylinder. Thus all the parts of the knot-tyer are rotated with the rotary head, while the hook is adapted to reciprocate, for a purpose hereinafter described.

Resuming the explanation of the operation of the parts of the knot-tyer, in Fig. 19 it will be observed that after the binding-arm has descended and carried the cord around the bundle the outer end of the twine is firmly held by the grasping-jaws, both ends $y$ $y'$ or portions of the loop are inserted between the jaws of the friction-holder, now in their open position, while the point of the binding-arm has carried the string past the grasping-jaw, so that the string bears against the lower surface of the reciprocating head of the grasping device. The large cam-gear continues to rotate until the anti-friction roller $t'$ on the lever T is moved outward by the cam $T'$, thereby releasing the projection $W^{12}$ on the short arm of the lever from the plate W of the friction-holder and allowing the spring $w^2$ to retract said plate and permit the twine to enter between the jaws of the friction-holder, the two ends $y$ $y'$ of the twine being grasped between the two jaws of the friction-holder, the large cam-gear continuing its revolution, and through the irregular-shaped cam $X'$, bell-crank levers X, and bracket $W^{10}$ moves outward both the cylinder $V^2$ of the rotary knot-tyer and the plate $W^5$ of the friction-holder, so that the outer end of the cylinder will come close to the point of the hook $V'$ and inclose the two ends of the twine between the cylinder $V^2$ and said hook and prevent their displacement, and also cause the two ends of the twine to enter the notch $W^6$ of the plate $W^5$, as represented in Fig. 21. Both ends of the twine are thus being carried by the hook $V'$ around the outer portion of the cylinder $V^2$, the twine being drawn through the friction-holder in the operation of forming a knot. The friction-holder serves to retain the twine while it is being wound about the knot-tying bill, and at the same time allows the twine to be pulled through the holder in tying the knot, thereby preserving the proper tension on the twine. After the hook $V'$ and cylinder referred to have made from one-quarter to one-third of a complete revolution the grasping-jaws are opened to release the end of the cord held therein, and when the parts have made a complete revolution and a complete loop of the two ends of the twine the grasping-jaws close and grasp the twine in rear of the point of the binding-arm. When the tying-bill and cylinder have made a complete revolution the tying-hook $X^2$, with its spring, will have been moved outward from the cylinder by means of the bell-crank lever and irregular-shaped cam, so as to project therefrom. The plate $W^5$ will also have been moved outwardly, so as to carry within its notch $W^6$ the two ends of the string across the loop on the cylinder and beyond the outer end of the latter, and guide it onto the free end of the spring $v^5$, which yields to the pressure exerted by the twine and allows it to enter the tying-hook $X^2$. The blunt edge of the notch $W^6$ enables the string to be carried without being cut. After the hook $V'$ and tying-hook have made about a third of a revolution farther the tying-hook, friction-holder, and shearing-plate $W^5$ are retracted. The tying-hook carries the two ends of the loop into the recess in the holder and grasps them firmly. The friction-holder is only retracted a short distance, when it becomes stationary, while the cylinder $V^2$ with its tying-hook continue their backward movement and draw the two ends of the cord through the loop, as shown in Fig. 22. After the two ends of the twine have been drawn through the loop the plate W⁵, in connection with the knife-edge on the friction-holder, serves to cut off the two ends of the twine, thereby allowing them to be drawn backward with the rotary head as the cylinder V² is drawn back to allow the loop to be pushed off by the head V, and thus the knot is formed. After the knot has been formed the cylinders V² and W⁵ are quickly moved forward by means of the bell-crank lever and irregular-shaped cam, and the tying-hook is moved outward from the cylinder, when the spring $v^5$ throws the ends of the string out of the hook, so that it will be impossible for the string to catch in the tying-hook when retracted. The hook V' is then rotated backward by the backward movement of the rack until it comes into proper position to again receive the twine, when the operation is repeated.

The cover Q of the knot-tying mechanism is provided with a cleat, Z, that fits against the side and the end of one of the pins $r^4$ and prevents it turning or being displaced. A cleat, Z', on the cover is cut away at the end, forming a recess, into which is received the other pin, $r^4$, when the cover is closed, and is thereby prevented from turning and endwise movement. The cleat Z' also rests on the studs $t$ and $z$, thereby preventing the displacement of the lever T and the gear-wheel R³. Cleat Z² on the cover rests on the stud $x'$ and prevents the displacement of the lever X. The cleat Z³ rests on the stud R', preventing the displacement of the gear-wheel R². Thus it will be observed that the cover, with its several cleats, serves to retain the different parts of the knot-tying device against displacement when the machine is in operation. By raising the cover the different parts of the knot-tyer may be readily taken apart without the use of a wrench or other device, it being simply necessary to remove three pins to take apart every piece of the knot-tying mechanism.

I make no claim in this application to my improved construction of clutch mechanism, as I reserve the right to make a separate application for the same.

Having fully described my invention, what I claim as new, and desire to secure by Letters Patent, is—

1. In a combined harvester and grain-binder, the series of rakes connected to flexible carriers, and means by which the rakes are moved forward of the cutter-bar and then downward in a vertical position into the standing grain, substantially as set forth.

2. In a combined harvester and grain-binder, the combination, with the harvester-platform, of harvester-rakes, means by which they are moved in front of the cutter-bar, then downward and rearward, and means for retaining the rakes in a vertical position during their descent, substantially as set forth.

3. The combination, with the harvester-platform, of endless chains having rakes connected therewith, sprocket-wheels arranged to conduct the rakes rearward in a line parallel to the harvester-platform and forward in an upward inclined direction, then downward into the standing grain, and means for retaining the rakes in a vertical position during their descent, substantially as set forth.

4. The combination, with a harvester-platform, of a series of harvester-rakes and means by which the rakes are moved forward of the cutter-bar and then downward in a vertical position, and means for tripping the rakes as they are moved rearward over the platform, substantially as set forth.

5. In a combined harvester and grain-binder, the combination, with a harvester-platform and binder-platform, of a series of independent rakes journaled in bearing-links attached to endless chains, and devices for automatically tripping the rakes and throwing them out of operative position, and for causing any particular rake of the series to carry the grain rearward to the binding-platform, substantially as set forth.

6. In a combined harvester and grain-binder, the combination, with endless chains and rakes journaled at opposite ends in bearing-links attached to said chains, of a reel located over the rear end of the harvester-platform, the ends of said reel being recessed for the reception of the bearing-links in the endless chains, substantially as set forth.

7. In a combined harvester and grain-binder, the combination, with endless chains and rakes journaled at opposite ends in bearing-links attached to said chains, of a reel located over the rear end of the harvester-platform, said reel having recesses in its ends for the admission of the bearing-links of the endless chains, and having the bar adjacent to said recesses located nearer the center of the reel than the remaining bars, substantially as set forth.

8. In a combined harvester and grain-binder, the combination, with endless chains and rakes journaled at their opposite ends in bearing-links attached to said chains, said rakes being provided with crank-arms, of a guideway extending in front of the cutter-bar and adapted to retain the crank-arms of the rakes therein during their descent and retain the rakes in a vertical position, substantially as set forth.

9. In a combined harvester and grain-binder, the combination, with endless chains and rakes journaled at their opposite ends in bearing-links attached to said chains, of crank-arms connected with the rakes, guideways, and switch mechanism constructed and arranged to cause the rakes to assume a vertical position in their descent and for a short distance rearward over the forward portion of the harvester-platform, and then to turn on their journals and pass over the accumulated cut grain on the harvester-platform, substantially as set forth.

10. In a combined harvester and grain binder, the combination, with the rakes for transferring the grain from the harvester-platform to the binder-platform, of a switch, a toothed wheel for regulating the position of the switch, and a toothed wheel arranged to be operated by the rakes and close the switch at certain intervals of time, substantially as set forth.

11. In a combined harvester and grain binder, the combination, with a series of harvester-rakes connected to a flexible carrier, of a switch, devices for actuating the switch by the rakes, and mechanism for setting the parts so that the switch will shift any one of the rakes, substantially as set forth.

12. In a combined harvester and grain binder, the combination, with endless chains and harvester rakes journaled in bearing-links attached to the chains, of a switch-lever, a toothed wheel, with which the switch-lever engages and serves as a pawl to prevent its backward rotation, a toothed wheel constructed to be operated by the harvester-rakes, and a device for setting the parts to cause the switch to close at any point in the travel of the rakes, substantially as set forth.

13. The combination, with the switch and spring for holding it open, of a shaft provided at one end with a toothed wheel to be actuated by the rakes and another wheel to be engaged by the switch, a spring-actuated drum connected with the opposite end of the shaft, a gear-wheel mounted on a stationary bearing encircling the shaft, said gear-wheel being provided with a stop with which engages a stop on the drum, and a rack-bar for adjusting the position of the gear-wheel, substantially as set forth.

14. The combination, with the switch, ratchet-wheels, and drum, of the gear-wheel, rack-bar, hand-wheel, and spring lever or catch, substantially as set forth.

15. The combination, with the switch and a spring-bar holding it open, of a sliding bar and connections for operating the same by the foot of the driver and relieve the switch from the action of the spring, substantially as set forth.

16. The combination, with the rakes and endless chains, of link-bearings having rounded bearings on their upper and lower sides and formed with tapered ends, substantially as set forth.

17. In a combined harvester and grain binder, the combination, with the harvester-rakes and stationary guide-rail, of the adjustable guide-rail section for regulating the travel of the rakes, substantially as set forth.

18. In a combined harvester and grain binder, the combination, with the harvester-rakes and stationary guide-rail, of the adjustable guide-rail section, a rock-shaft connected therewith, an operating-lever, and a holding-plate, substantially as set forth.

19. In a combined harvester and grain binder, the combination, with the harvester platform and rakes, of a binder-platform located in the rear of the harvester-platform, guide-rails supported on the binder-platform, endless chains encircling sprocket-wheels mounted on said guide-rails, rakes journaled in bearing-links attached to said chains and arranged to travel transversely to the travel of the harvester-rakes, and devices for retaining the binder-rakes in a vertical position as they descend and engage the grain and as they rise and are disengaged from the grain, substantially as set forth.

20. The combination, with the driving-shaft of the binding mechanism and a clutch supported on said shaft, of a series of harvester-rakes attached to endless carriers, and tripping devices constructed and arranged substantially as described, whereby the binding mechanism is automatically put in operation at certain intervals of time by the harvester-rakes, substantially as set forth.

21. The combination, with the binding-arm, of a jointed compressor-arm pivoted to the frame, a link pivoted at one end to the compressor-arm and at its other end to the binding-arm, and a yielding rod secured at one end to the compressor-arm and at its other end to the frame, substantially as set forth.

22. The combination, with the driving-shaft and two-armed crank M, provided with the anti-friction rollers $m$ $m'$, of a cam-yoke, M', provided with the irregular interior trackway described, the slide $M^2$, link $M^5$, and binder-shaft, substantially as set forth.

23. The combination, with binding-arm and shaft, of a cam-yoke, a two-armed crank engaging therewith, and a crank connected with the yoke and attached to the binding-arm shaft, substantially as set forth.

24. The combination, with the two-armed crank, cam-yoke, and slide, of the binding-arm shaft provided with a groove, and the crank connected therewith, provided with a spline to allow of a longitudinal movement of the binding-arm shaft, substantially as set forth.

25. The combination, with a rotary knot-tyer, of a friction-holder consisting of two reciprocating jaws, one of said jaws being bent outward in the form of a loop, substantially as set forth.

26. The combination, with the rotary knot-tyer, of a friction-holder, one portion of which is formed with a cutting-edge, and a reciprocating cutter arranged to engage therewith and sever the cord, substantially as set forth.

27. The combination, with main cam-gear, a lever actuated thereby, and a bracket connected to a sliding rod pivoted to the cam-actuated lever, of the knot-tyer and cutting device mounted at one end in said bracket and reciprocated thereby, substantially as set forth.

28. The combination, with the reciprocating bracket having an open slot formed in its upper end and flanges at the side of said slot, of the reciprocating cutter constructed with a screw-threaded shank supported in said slot, and adjusting-nuts on said shank and arranged on opposite sides of the bracket and prevented from turning by said flanges, substantially as set forth.

29. The combination, with the rotary head V, provided with the hook V', of the reciprocating cylinder $V^2$, sliding shaft $V^3$, and hook $X^2$, the latter being inserted in a groove in the cylinder $V^2$, and attached to the shaft $V^3$, and a spring encircling the shaft, substantially as set forth.

30. In a rotary knot-tyer, the combination, with the rotary shaft, a sliding cylinder mounted thereon, and a spring encircling the shaft and bearing against the rear end of the sliding cylinder, of a knotting-hook provided with a hooked shank for securing the shaft and cylinder together, substantially as set forth.

31. The combination, with the cylinder provided with a deep slot, of the tying-hook having a spring attached thereto, and provided with bearing-flanges for supporting the shank of the hook in the outer portion of the groove or slot, substantially as set forth.

32. The combination, with the cylinder provided with a recessed end, of the tying-hook made semicircular in form, and adapted to fit in said recess, substantially as set forth.

In testimony whereof I have signed this specification in the presence of two subscribing witnesses.

WILLIAM P. HALE.

Witnesses:
ERASTUS ALDRIDGE,
FRANK E. WILLIAMS.